United States Patent

Goossens

Patent Number: 5,550,467
Date of Patent: Aug. 27, 1996

[54] SENSOR INCLUDING A FOLLOWER FOR ENGAGING THE ROTATING PORTION OF A BEARING AND HAVING A SLIDING LAYER APPLIED TO THE HOUSING AND ENCODER RING

[75] Inventor: Andre F. L. Goossens, Rumst, Belgium

[73] Assignee: ITT Automotive Europe GmbH, Germany

[21] Appl. No.: 325,465

[22] PCT Filed: Apr. 6, 1993

[86] PCT No.: PCT/EP93/00846

§ 371 Date: Oct. 28, 1994

§ 102(e) Date: Oct. 28, 1994

[87] PCT Pub. No.: WO93/22687

PCT Pub. Date: Nov. 1, 1993

[30] Foreign Application Priority Data

Apr. 29, 1992 [DE] Germany .................. 42 13 979.1

[51] Int. Cl.⁶ .................. G01P 3/48; G01B 7/14; F16C 41/04
[52] U.S. Cl. .................. 324/173; 324/207.22; 384/448
[58] Field of Search .................. 324/173, 174, 324/207.25, 207.22; 384/446, 448

[56] References Cited

U.S. PATENT DOCUMENTS

| | | |
|---|---|---|
| 3,683,219 | 8/1972 | Kruse . |
| 4,027,753 | 6/1977 | Lantz . |
| 4,529,933 | 7/1985 | Bleeke ............................ 324/173 |
| 4,759,218 | 7/1988 | Rodi et al. ...................... 73/493 |
| 4,978,234 | 12/1990 | Ouchi ............................ 324/173 |
| 5,019,774 | 5/1991 | Rosenberg ................... 324/207.25 X |
| 5,027,067 | 6/1991 | Witzig et al. ............... 324/207.22 X |
| 5,172,054 | 12/1992 | Nohara et al. .............. 324/173 X |

FOREIGN PATENT DOCUMENTS

| | | |
|---|---|---|
| 0226828 | 7/1987 | European Pat. Off. . |
| 0400241 | 12/1990 | European Pat. Off. . |
| 2075781 | 1/1971 | France . |
| 2659450 | 9/1991 | France . |
| 2244948 | 4/1974 | Germany . |
| 1-254401 | 11/1989 | Japan ................. 384/448 |

OTHER PUBLICATIONS

International Search Report for PCT/EP93/00846 filed Apr. 6, 1993.
International Examination Report for Appln PCT/EP93/00846 filed Jun. 4, 1993.

Primary Examiner—Sandra L. O'Shea
Assistant Examiner—Roger Phillips
Attorney, Agent, or Firm—J. Gordon Lewis; Thomas N. Twomey

[57] ABSTRACT

A device for measuring rotation which is mounted into a wheel bearing. The device is substantially composed of a transducer arranged around the axis or rotation of the part performing the rotation, and of a signal generator ring which is part of a hollow-cylindrical or bowl-shaped signal generator component part. The signal generator ring is supported rotatably on a cylindrical part of the transducer.

2 Claims, 3 Drawing Sheets

SENSOR INCLUDING A FOLLOWER FOR ENGAGING THE ROTATING PORTION OF A BEARING AND HAVING A SLIDING LAYER APPLIED TO THE HOUSING AND ENCODER RING

FIELD OF THE INVENTION

The present invention relates to a device for measuring rotation and for generating an electric alternating signal representative of the rotation.

BACKGROUND OF THE INVENTION

Devices for measuring rotational speed are required for instance for the measurement of the wheel speeds for anti-lock control systems, traction slip control systems or vehicle suspension control systems of automotive vehicles. In such applications, every vehicle wheel is equipped with such a wheel sensor. High demands are placed on the operability and reliability of the sensors. A major portion of the total costs for such a control system is incurred for the manufacture and the assembly of the sensors. It is in particular required in known rotation measuring devices to accurately adjust and preserve the air gap between the stationary transducer or sensor, respectively, and a toothed disc coupled to the wheel. The usefulness of the signal and the distance of the useful signal from inevitable corrective signals is dictated to a large degree by the adjustment and the preservation of the air gap. Therefore, there is a need to develop sensors which allow manufacturing with relatively little effort and which lend themselves to ease of assembly and, if necessary, ease of replacement.

Further, so-called wheel bearing sensors are known wherein the sensor and the pulse generator ring (or the toothed disc) are mounted directly into the wheel bearing. As a result, the sensor is required to fit within small spaces. However, precise assembly and adjustment is still necessary because tolerances for the air gap between the sensor and the pulse generator ring have to be maintained.

SUMMARY OF THE INVENTION

The object of the present invention is to develop a measurement device which is particularly suited for mounting into a wheel bearing and which is easy to manufacture, compact in design, and simple to assemble and adjust.

It has proved that this object can be achieved by a measurement device of the type initially referred to if the transducer is arranged in the axis of rotation of the part performing the rotation and the signal generator ring is designed as a component part of a hollow-cylindrical or bowl-shaped part which is rotatably supported on the housing of the transducer and is coupled to the part performing the rotation by means of a follower, by a snug fit or the like.

The present invention is a particularly simple measurement device comprising a signal generator ring in the form of a hollow-cylindrical part which is rotatably supported directly on the housing of the transducer and which, during the assembly of the sensor, is coupled to the wheel by means of a follower. Because the signal generator ring does not have to transmit any forces, it is sufficient to apply a sliding layer on the sensor housing for the support of this ring.

Further, it is an advantage that the signal generator ring can be fitted on the sensor prior to assembly so that the need for a setting is obviated when the complete measurement device is mounted into the wheel bearing.

A preferable embodiment of the present invention includes a double-sided measurement system arranged in the sensor housing perpendicularly to the axis of rotation. An improvement of the useful signal can be accomplished thereby even when the transducer has a compact design. Further, the requirements regarding the central position of the transducer with respect to the signal generator ring are minimized because an increased air gap on one side automatically results in a decreased air gap on the other side of the double-sided measurement system.

In another embodiment, the present invention includes a particularly expedient double-sided measurement system including a measuring coil which contains a permanent magnet core magnetized perpendicularly relative to the measuring coil axis. Arranged on the two pole surfaces of the permanent magnet is each one elongated, plate-shaped pole shoe. The pole shoes project on either side of the coil and extending almost up to the inner surface of the signal generator housing. A useful signal can be derived by the present invention by arranging the pole shoes in relation to the arrangement of the teeth or the magnetic segments of the signal generator ring.

Further features, advantages and possibilities of application of the present invention can be taken from the following description of embodiments with reference to the illustrations.

DESCRIPTION OF THE PREFERRED EMBODIMENTS

Figure 1:
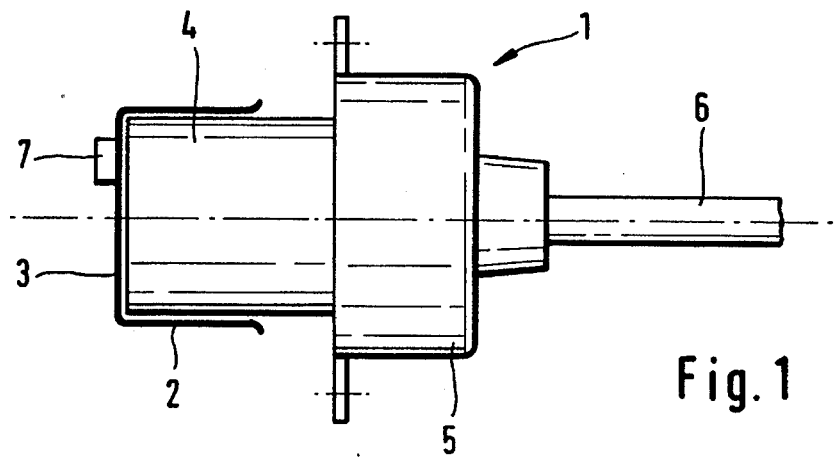
FIG. 1 is a simplified side view of a first embodiment of the measurement device according to the present invention.

In FIG. 1 the device according to the present invention is composed of a transducer 1, generally referred to as sensor, and a signal generator ring 2 which herein is a part of a bowl-shaped signal generator component part 3.

The transducer or sensor i includes a cylindrical housing part 4 in which the actual measurement system is accommodated and on which the signal generator ring 2 is rotatably mounted and supported. A housing part 5 of the transducer serves above all for retaining and securing the sensor 1 to a stationary component part of the automotive vehicle or the wheel bearing. Further, an electric cable 6 is passed through this component part 5 for connecting the transducer 1 to an analyzing logic not illustrated in FIG. 1.

The signal generator component part 3 is equipped with a follower 7 which is symbolically indicated in FIG. 1. When the illustrated measurement device is fitted to the wheel bearing—see FIGS. 2 and 3—the follower 7 grips into a corresponding recess of the wheel or the wheel bearing part performing the rotation so that the signal generator component part 3 rotates jointly with the part performing the rotation to be measured. Yet the transducer 1 is mounted stationarily around the axis of rotation which is symbolized in dash-dotted lines.

Figure 2:
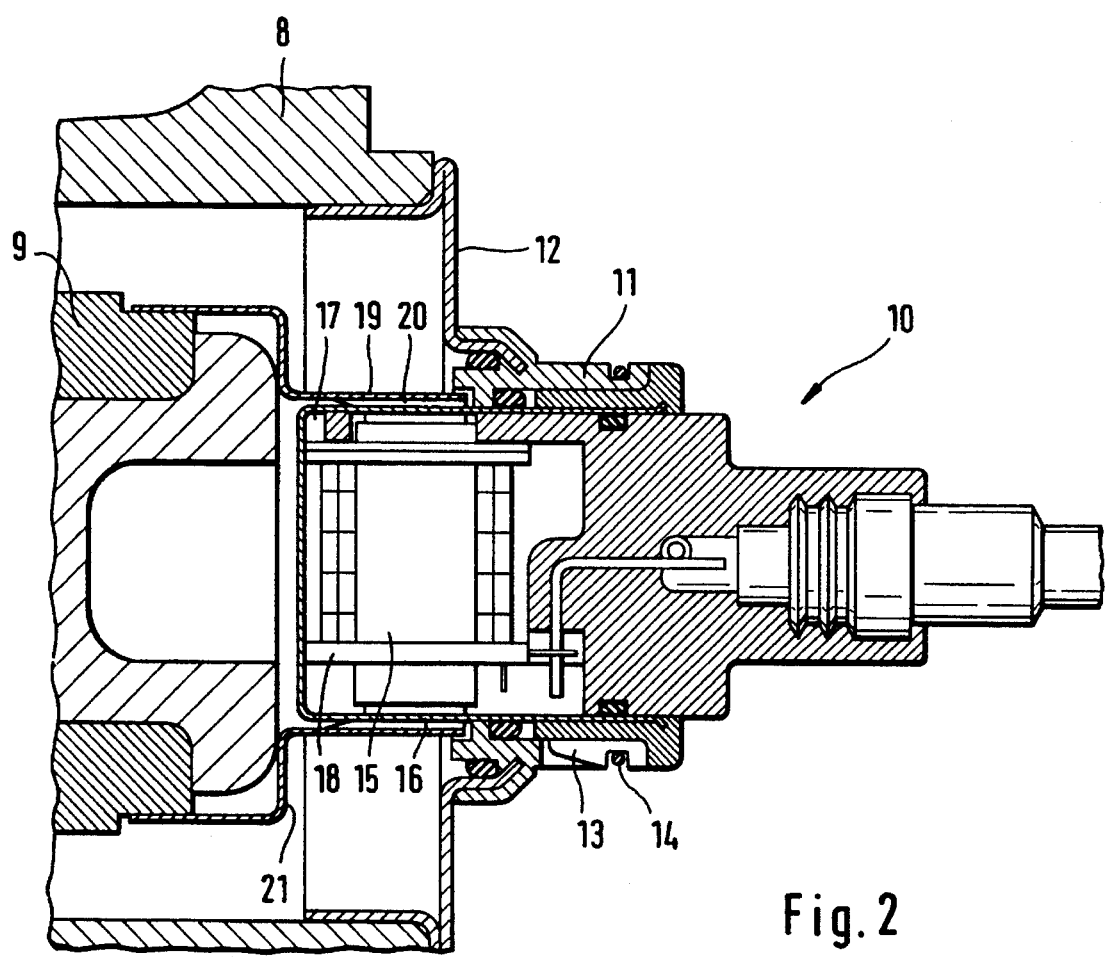
FIG. 2 is a longitudinal cross-sectional view of the embodiment of the measurement device according to FIG. 1.

FIG. 2 shows details of a measurement device designed according to the principle described in FIG. 1 and fitted into a wheel bearing of a vehicle in this case. Reference numeral 8 designates part of the stationary wheel bearing outer ring, reference numeral 9 designates the end piece of the corresponding wheel bearing inner ring co-rotating with the wheel. In this case, a pluggable transducer or, respectively, sensor 10 is concerned which is seated in a mounting support 11 that is herein inserted into the grease cap 12 of the wheel bearing 8, 9 or is designed as a component part of this grease cap 12. The sensor 10 is held in a predetermined angular position in the mounting support 11 by means of a detent 13 which engages into a mating recess of the sleeve-shaped mounting support 11. A spring 14 is likewise comprised in the mounting support mechanism. A mounting support of this type is characterized by a simple construction and permits above all a very fast assembly and disassembly.

The measurement system comprises a double-sided measuring coil (inductive sensor) 15 which is arranged perpendicularly relative to the axis of the sensor 10 which is identical with the axis of rotation of the wheel (not shown). The measuring coil 15, the individual component parts of which are not illustrated in the drawing, comprises preferably a permanent magnet core and pole shoes which project on either side from the coil interior and extend up to the wall 16 of the cylindrical housing part 17 of the illustrated sensor 10. The measuring coil itself, in the interior of which the permanent magnet core and the pole shoes are disposed, is substantially composed of a coil member 18 and of at least one coil.

A signal generator ring 2 which has been explained already in FIG. 1 is arranged on the cylindrical housing 17 so as to be rotatable in relation to the stationary sensor 10. The signal generator ring 19 has an internal toothing 20. The alternation of teeth and tooth gaps as a result of a rotation leads in a known manner to the variation of a magnetic flux which is generated by a permanent magnet arranged in the interior of the measuring coil 15. This change in the magnetic flux, in turn, results in the induction of a voltage in the winding of the measuring coil 15. Of course, a perforated ring or a ring composed of magnetic and non-magnetic segments can be used instead of the internal toothing.

In FIG. 2 the signal generator ring 19 is designed as a bowl-shaped or stepped hollow-cylindrical component part 21 which, in this embodiment, is coupled by a snug fit or by a follower with the bearing inner ring 9 co-rotating with the wheel. Since the cylindrical part of the signal generator component part 21, which part forms or carries the signal generator ring 19, is supported on the cylindrical housing of the sensor 10 and does not have to transmit any forces, there is no need for a stable securement of the component part 21 to the bearing inner ring 9. It has to be safeguarded only to the extent that the signal generator component part 21 is "entrained" by the part performing the rotation. These requirements can be met by a relatively simple construction which permits an easy and fast assembly and, if necessary, also the exchange of the complete measurement device according to the present invention.

Figure 3:
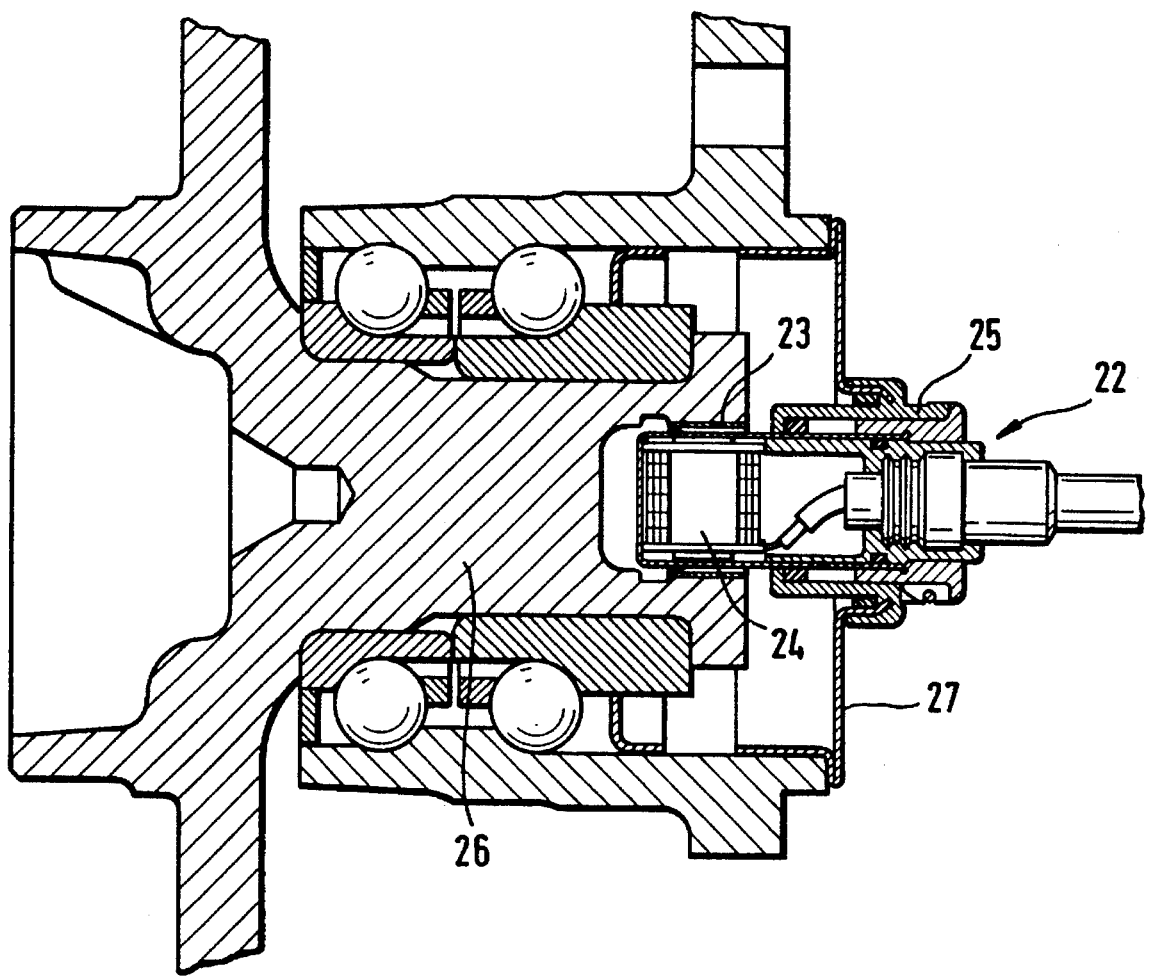
FIG. 3 is a cross sectional view of a second embodiment of a measurement device according to the present invention.

The embodiment of the present invention according to FIG. 3 differs from the construction according to FIG. 2 by a still more compact structure of the measurement device. In this case, the transducer 22 is slipped into a mounting support provided for this purpose jointly with the signal generator ring 23 which has already previously been fitted rotatably onto the sensor housing. In turn, a double-sided measuring coil 24 which is arranged perpendicularly relative to the axis of rotation is incorporated in the sensor housing in the area of the signal generator ring 23. A mounting support 25 for accommodating, positioning and arresting the slipped-in sensor 22, in turn, is provided as a component part of the wheel bearing grease cap 27. An axial bore for the signal generator ring 23 is provided in the rotatably supported shaft 26 of a wheel. When slipping in the complete measurement device composed of signal generator ring 23 and sensor 22, the signal generator ring 23 is brought into engagement with the wheel shaft 26 in any known fashion in order that the signal generator ring 23 can rotate jointly with the wheel on the cylindrical housing of the stationary transducer 22. In a like construction, the adjustment of the air gap between the housing of the sensor 22 and the signal generator ring 23 is ensured within close tolerances merely by slipping in, without additional setting.

Figure 4:
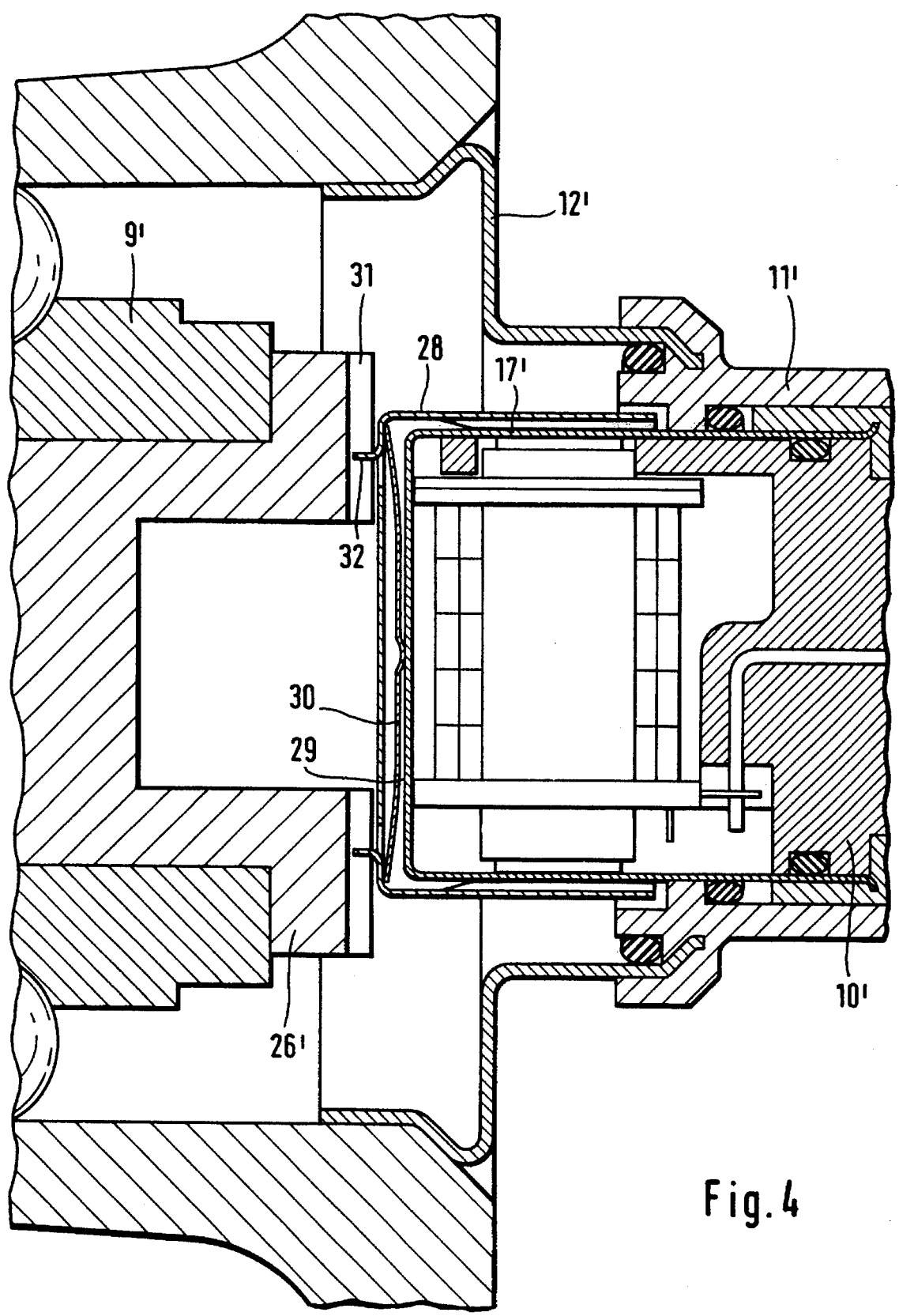
FIG. 4 is a cross sectional view of a third embodiment of the present invention having a modified signal generator ring.

FIG. 4 shows a design variant according to the present invention wherein the coupling of a signal generator ring 28 with the bearing inner ring 9' or a steering knuckle, which latter rotates jointly with the part performing the rotation, is achieved in a particularly clever fashion. In addition, the design of the sensor 10', of the mounting support 11' and the insertion of the sensor into a grease cap 12' is largely similar to the embodiment described by way of FIG. 2.

The signal generator ring 28 of the device according to FIG. 4, in turn, is supported on the cylindrical housing part 17' of the sensor 10'. By means of a leaf spring 30 taking support on the end surface 29 of the sensor housing, the signal generator ring 28 in this embodiment is urged against the bearing inner ring provided with a toothing 31. Cams 32 which can be compared with the follower 7 according to FIG. 1 ensure that the rotation of the inner ring 9' is transmitted to the signal generator ring 28.

This construction permits to use very small toothed wheels because the air gap between the signal generator ring 28 and the sensor pole shoes can be kept very small. Also, the sensor signal magnitude is largely independent of the conventionally occurring deformations of the bearing.

I claim:
1. A device for the measurement of rotation and for generation of an electric alternating signal representative of the rotation, comprising:
   a part performing the rotation about a first axis;
   a stationary transducer accommodated in a housing and arranged around said first axis, said housing having a peripheral surface; and
   a signal generator ring rotating jointly with said part and including a portion with an inner surface, said portion being rotatably supported around said housing of said transducer and coupled to said part performing the rotation by means of at least one of a follower and a snug fit;
   said housing of said transducer at least in part being of cylindrical design, said housing peripheral surface and said signal generator ring portion inner surface abutting thereon being coated with a sliding layer.

2. A device for the measurement of rotation and for generation of an electric alternating signal representative of the rotation, comprising:

a part performing the rotation around an axis, said part being a part of a wheel bearing;

a mounting support secured to a stationary part of said wheel bearing and arranged around said axis;

a transducer adapted to be arranged around said first axis; and a signal generator ring adapted to be rotatably supported around said transducer and having a coupling with said part performing rotation, said transducer together with said supported signal generator ring being slipped into said mounting support, said coupling being effected by means of a follower secured to said signal generator ring and to said wheel bearing part performing the rotation.

* * * * *